(12) United States Patent
You

(10) Patent No.: US 11,255,361 B1
(45) Date of Patent: Feb. 22, 2022

(54) CLAMP AND METHOD FOR USING THE SAME

(71) Applicant: Yueqing Dongbo Electromechanical Co., Ltd., Zhejiang (CN)

(72) Inventor: Yixian You, Zhejiang (CN)

(73) Assignee: Yueqing Dongbo Electromechanical Co., Ltd., Zhejiang (CN)

( * ) Notice: Subject to any disclaimer, the term of this patent is extended or adjusted under 35 U.S.C. 154(b) by 0 days.

(21) Appl. No.: 17/037,548

(22) Filed: Sep. 29, 2020

(30) Foreign Application Priority Data

Aug. 17, 2020 (CN) .......................... 202010823532.0

(51) Int. Cl.
| | | |
|---|---|---|
| *F16L 33/02* | (2006.01) | |
| *F16B 2/08* | (2006.01) | |
| *F16L 33/025* | (2006.01) | |
| *F16L 33/035* | (2006.01) | |

(52) U.S. Cl.
CPC .............. *F16B 2/08* (2013.01); *F16L 33/025* (2013.01); *F16L 33/035* (2013.01); *Y10T 24/1457* (2015.01)

(58) Field of Classification Search
CPC ......... F16B 2/08; F16L 33/035; F16L 33/025; Y10T 24/1478; Y10T 24/1457
See application file for complete search history.

(56) References Cited

U.S. PATENT DOCUMENTS

| 2,811,375 | A | * | 10/1957 | Ehrlich | ................. | B64D 37/02 |
| | | | | | | 285/342 |
| 5,033,167 | A | * | 7/1991 | Uchman | ............... | F16L 33/035 |
| | | | | | | 24/20 R |
| 2017/0184235 | A1 | * | 6/2017 | You | ....................... | F16L 33/025 |

FOREIGN PATENT DOCUMENTS

| CN | 104662352 | | 5/2017 | | |
| WO | WO-2018210538 | A1 | * | 11/2018 | ............. F16L 33/03 |

OTHER PUBLICATIONS

Machine Translation of WO 2018210538 produced Aug. 19, 2021 on the Patentscope website. (Year: 2021).*

* cited by examiner

*Primary Examiner* — Robert Sandy
*Assistant Examiner* — Michael S Lee
(74) *Attorney, Agent, or Firm* — JCIP Global Inc.

(57) ABSTRACT

This application provides a clamp and a method for using the same. The clamp includes a clamping band which is wound to form a clamp body defining an accommodating area. The clamp body is provided with a tightening lug. The clamp body includes an overlapping portion and a single layer portion which is provided with a positioning member. The positioning member is connected to the clamp body such that the positioning member is slidable toward an inner side of the accommodating area with one end extending into the accommodating area. An inner wall of the clamp body is gradually approaching an outer wall of a pipe with the tightening of the clamp, the positioning member moves outward relative to the clamp body until the inner wall of the clamp body rests against the outer wall of the pipe, and then the positioning member falls off from the clamp body.

8 Claims, 6 Drawing Sheets

CLAMP AND METHOD FOR USING THE SAME

CROSS-REFERENCE TO RELATED APPLICATION

The present application claims the priority of China application No. 202010823532.0, filed on Aug. 17, 2020. The entirety of the above-mentioned patent application is incorporated by reference herein and made a part of this specification.

BACKGROUND

Technical Field

This application relates to a technical field of a fastening member, and more particularly, to a clamp and a method for using the same.

Description of Related Art

Fasteners winding around pipes, such as a clamp, which is also called a hold hoop, have a circular inner surface and a wide application in various pipes in life.

A Chinese publication authorized announcement No. CN104662352B discloses a clamp including a clamping band and an ear-shaped fastening device which includes two legs extending radially outward and a rib connecting outer ends of the legs to each other. When fixing the pipe, the clamp is sleeved on the pipe at a fixing position thereof, there is a gap between the inner wall of the clamp and the outer wall of the pipe for adjustment, and then pliers are used to press two legs of the ear-shaped fastening device inward toward the rib, thereby tightening and fixing the clamping band.

The above technical solution suffers from the following disadvantages. When a plurality of clamps are required for the fixation of the pipe, in order to facilitate the operation, each clamp is sleeved at the fixing position for primary positioning, which facilitates the overall adjustment of the pipe, and then the pliers are used to tighten and fixe all the clamps in turn. Such operation may lead to a problem that as the appearance of the clamp has no difference before and after tightening, clamps may be missed without tightening, resulting in the leakage of the pipe.

SUMMARY

In a first aspect, this application provides a clamp having a function of indicating whether the clamp is tightened.

A clamp includes a clamping band which is wound to form a clamp body defining an accommodating area. The clamp body includes a single layer portion and an overlapping portion which includes an outer band body and an inner band body. The overlapping portion of the clamp body is provided with a tightening lug. The clamp also includes a positioning member disposed at the single layer portion of the clamp body; and the positioning member is connected to the single layer portion of the clamp body such that the positioning member is slidable toward an inner side of the accommodating area with one end of the positioning member extending into the accommodating area.

An inner wall of the clamp body is gradually approaching an outer wall of a pipe with the tightening of the clamp, and upon the positioning member contacts the pipe, the positioning member presses against the outer wall of the pipe, such that the positioning member moves outward relative to the clamp body until the inner wall of the clamp body rests against the outer wall of the pipe, the positioning member falls off from the clamp body, indicating a staff that the clamp has been tightened. Moreover, if the positioning member does not completely fall off after tightening the clamp body, the positioning member can be manually removed for recycling.

Further, a tightening stroke of the tightening lug is in a range of 4-14 mm.

The tightening stroke depends on the customary diameter of the pipe such that the clamp is applicable to tighten and fix most pipes.

Further, the accommodating area is elliptical shape that has a long axis and a short axis.

The clamp body winds around the pipe with the accommodating area receiving the pipe. The elliptical accommodating area can effectively plays a role of anti-looseness, the short axis of the clamp body presses against an outer wall of the pipe at two ends to achieve linear contact, such that the clamp will not slip or loosen relative to the pipe. When sleeving, two ends of the long axis of the clamp body are pressed such that the accommodating area is substantially circular into which the pipe can get with ease, and the operation is simple and convenient.

Further, a length radio of the long axis to the short axis is in a range of 65%-85%.

The length ratio of the short axis to the long axis depends on the diameter of the common pipe and the tightening stroke of the tightening lug, in which setting that the length of the short axis is slightly smaller than the diameter of the pipe, the difference between the perimeter of the clamp body and that the pipe is within the range of the tightening stroke of the tightening lug. Therefore, this scope is the best implementation scope.

Further, the positioning member is disposed in the single layer portion and located in a segment of the single layer portion between the short axis and the long axis.

It avoids that the positioning member does not contact the outer wall of the pipe after the clamp body deforms and restores when the positioning member is disposed at the end of the long axis. It avoids that the clamp body is pressed to be detached from the pipe after it deforms and restores when the positioning member is disposed at the end of the short axis.

Further, one end of the positioning member includes a top-contact head extending into the accommodating area. A minimum distance between a surface of the top-contact head and a center of the accommodating area and a radius of a pipe to be received by the clamp body satisfy the following relationship. When the clamp body is elliptical without deformation, $Q \leq r$; when the clamp body is pressed such that the accommodating area is circular, $Q+R>2r$; and when the clamp body completely tightens the pipe, $R'<r$; wherein Q is the minimum distance between the surface of the top-contact head and the center of the accommodating area, r is the radius of the pipe to be received by the clamp body, R is a radius of the accommodating area when the clamp body is pressed such that the accommodating area is circular, and R' is the radius of the accommodating area when the clamp body completely tightens the pipe.

When the clamp body is to be sleeved outside the pipe, two ends of the long axis of the clamp body is first pressed, such that the accommodating area is substantially circular, therefore the pipe can be free of contacting with the positioning member and get into the accommodating area. Then, the clamp body is released to deform and restore, at this time, both ends of the short axis of the clamp body and the top-contact head press against the outer wall of the pipe, such that three-point contact increases the friction between the clamp body and the pipe, achieving anti-looseness effect and avoiding the deviation of the clamp body relative to the pipe. When the clamp body completely tightens the pipe, the clamp body presses against the surface of the pipe to deform, while the top-contact head presses against the pipe and falls off from the clamp body.

Further, the single layer portion has a positioning hole. The top-contact head passes through the positioning hole. One end of the top-contact head that is located in the accommodating area is provided with a limit portion protruded in a radial direction. The other end of the top-contact head located outside the clamp body is provided with a limit block.

The limit portion is used to prevent relative movement between the top-contact head and the positioning hole and prevent the positioning member from falling out of the positioning hole under the action of vibration or slight external force, which causes misleading.

Further, the top-contact head is in a shape of a round rod. The top-contact head has a slot that extending axially along and radially through the top-contact head such that the limit portion is divided into two parts being spaced apart.

Further, the top-contact head is in a shape of a block, and one end of the top-contact head located in the accommodating area is provided with an abutting surface that is arcuate about a center of the accommodating area; and the top-contact head has two slots extending through both sides.

The annular abutting surface is used to contact the outer wall of the pipe, which increases the contact area and improves stability, preventing the top-contact head from deviating to one side when it presses against the surface of the pipe which affects the falling of the positioning member.

In a second aspect, this application provides a method for using the clamp, which includes the following step:

step S1, winding the clamping band into the clamp body that defines the accommodating area with an elliptical shape;

step S2, pressing two ends of the clamp body in a direction of a long axis such that the accommodating area is substantially circular, and making the clamp body wind around a pipe such that the clamp body presses against an outer wall of the pipe at two ends of a short axis; and step S3, tightening a tightening lug by pliers so as to tighten the clamp body, such that a top-contact head of the positioning member presses against the outer wall of the pipe and is gradually pressed out of a positioning hole during tightening until an inner wall of the clamp body rests against the outer wall of the pipe, followed by that the positioning member falls off from the clamp body.

The positioning member is convenient to disassemble and assemble and can be recycled, which has low cost and a good indicating effect.

In summary, this application has the following advantages.

The inner wall of the clamp body is gradually approaching the outer wall of the pipe with the tightening of the clamp, and upon the positioning member contacts the pipe, the positioning member presses against the outer wall of the pipe, such that the positioning member moves outward relative to the clamp body until the inner wall of the clamp body rests against the outer wall of the pipe, the positioning member falls off from the clamp body, indicating a staff that the clamp has been tightened.

The clamp body winds around the pipe with the accommodating area receiving the pipe. The elliptical accommodating area can effectively plays a role of anti-looseness, the short axis of the clamp body presses against an outer wall of the pipe at two ends to achieve linear contact, such that the clamp will not slip or loosen relative to the pipe; and when sleeving, two ends of the long axis of the clamp body are pressed such that the accommodating area is substantially circular into which the pipe can get with ease, and the operation is simple and convenient.

DESCRIPTION OF THE EMBODIMENTS

This application is described in detail below in combination with embodiments.

Embodiment I

Figure 1:
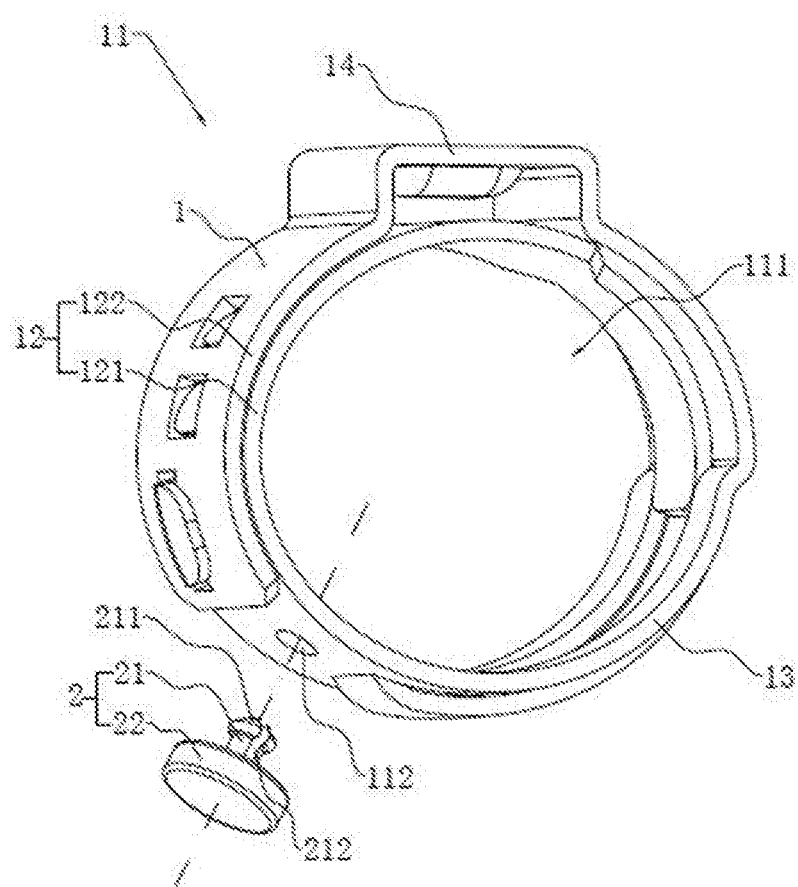
FIG. 1 is a schematic view of an overall structure of Embodiment I.
Figure 2:
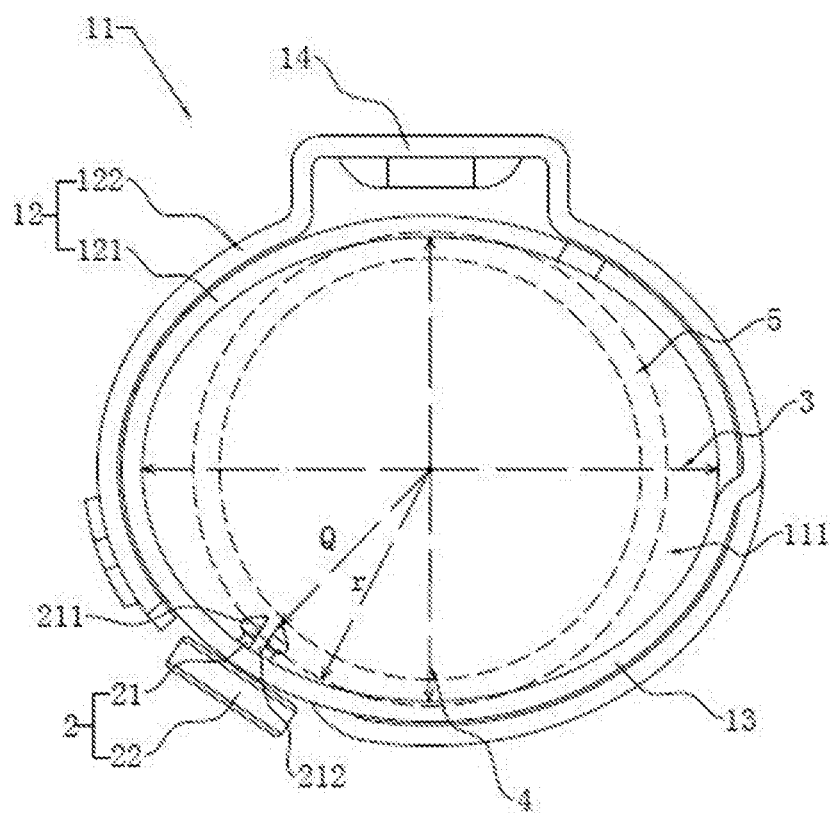
FIG. 2 is a structural schematic view of a clamp body of Embodiment I when it is elliptical without being pressed.

A clamp provided in this embodiment, as shown in FIG. 1 and FIG. 2, includes a clamping band 1. The clamping band 1 is wound into a clamp body 11 that defines an accommodating area 111 for a pipe 5 to get into, such that the clamp body 11 is sleeved outside the pipe 5. The clamp body 11 includes a single layer portion 13 and an overlapping portion 12 which includes an outer band body 122 and an inner band body 121. The outer band body 122 has a plurality of engaging slots, and the inner band body 121 is provided with a plurality of corresponding engaging members (the engaging slots and engaging members are not shown in the figures), in which the engaging members pass through the engaging slots to achieve engagement, such that the clamp body 11 is annular. The outer band body 122 is also provided with a tightening lug 14 which can be tightened by pliers so as to tighten the clamp body 11, thereby fixing the pipe 5 in the accommodating area 111.

As shown in FIG. 2, the accommodating area 111 formed by winding the clamping band 1 is elliptical in a natural state, which has a short axis 4 and a long axis 3. The length of the short axis 4 is slightly smaller than the diameter of the pipe 5. When the clamp body 11 winds around the pipe 5, the elliptical accommodating area 111 can effectively plays a role of anti-looseness. The short axis 4 of the clamp body 11 presses against an outer wall of the pipe 5 at two ends to achieve linear contact, such that the clamp will not slip or loosen relative to the pipe 5. When sleeving, two ends of the long axis of the clamp body 11 are pressed such that the accommodating area 111 is substantially circular into which the pipe 5 can get with ease.

As shown in FIG. 2, a length ratio of the short axis 4 to the long axis 3 is 75%, and a tightening stroke is in a range of 4-14 mm. The length ratio of the short axis 4 to the long axis 3 depends on the diameter of the common pipe 5 and the tightening stroke of the tightening lug 14. Given that the length of the short axis is slightly smaller than the diameter of the pipe 5, the difference between the perimeter of the clamp body 11 and that the pipe 5 is within the range of the tightening stroke of the tightening lug 14.

As shown in FIG. 1 and FIG. 2, the single layer portion 13 of the clamp body 11 is formed with a positioning hole 112 in a segment of the single layer portion between the short axis 4 and the long axis 3, and a positioning member 2 passes through the positioning hole 112. The positioning member 2 includes a top-contact head 21 and a limit block 22 integrally formed at one end of the top contact head 21. The top contact head 21 passes through the positioning hole 112 with one end extending into the accommodating area 111, while the limit block 22 is located outside the clamp body 11. The inner wall of the clamp body 11 is gradually approaching the outer wall of the pipe 5 with the tightening of the clamp, and upon the positioning member 2 contacts the pipe 5, the positioning member 2 presses against the outer wall of the pipe 5, such that the positioning member 2 moves outward relative to the clamp body 11 until the inner wall of the clamp body 11 rests against the outer wall of the pipe 5, the positioning member 2 falls off from the clamp body 11, indicating a staff that the clamp has been tightened.

Figure 3:
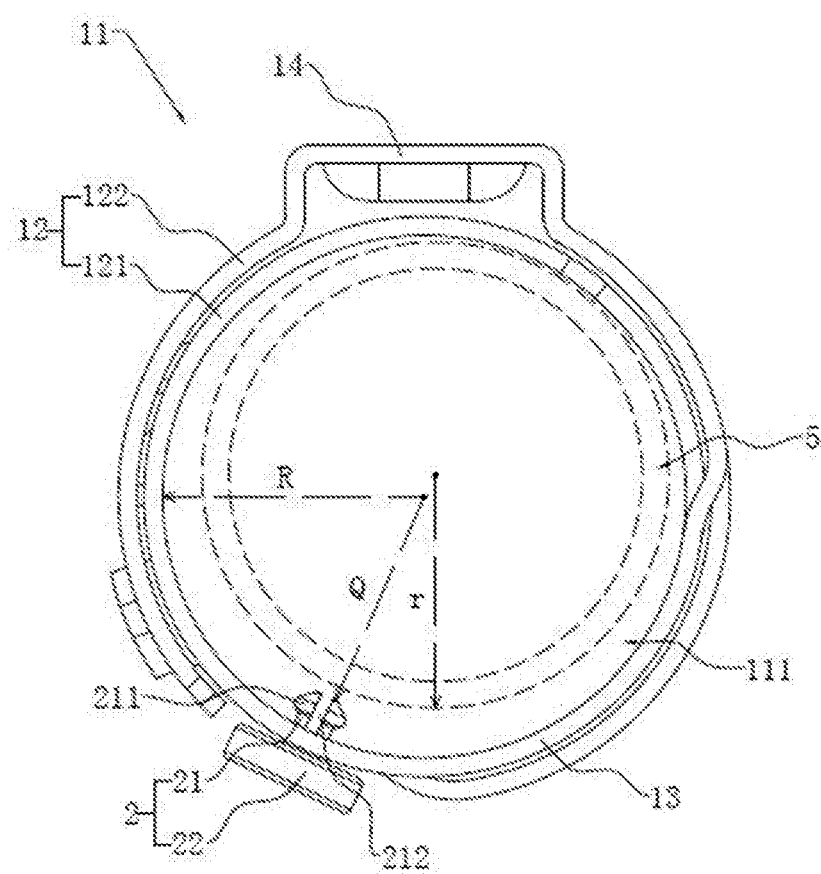
FIG. 3 is a structural schematic view of the clamp body of Embodiment I when it is circular under pressing.
Figure 4:
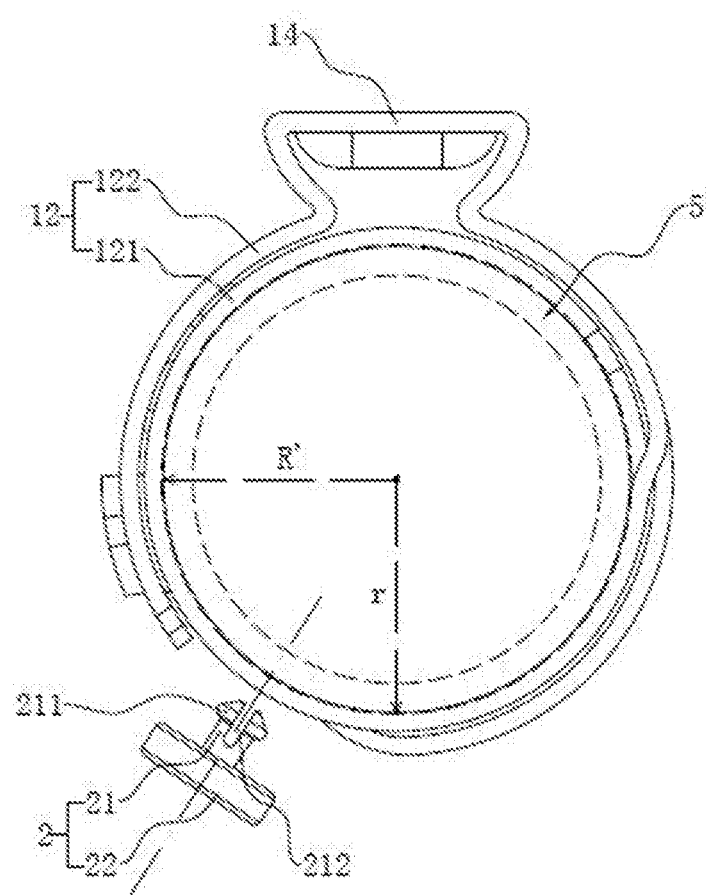
FIG. 4 is a schematic view of Embodiment I showing that the clamp body tightens a pipe.

As shown in FIG. 2 and FIG. 3, a minimum distance between the surface of the top-contact head 21 and the center of the accommodating area 111 is Q, and the radius of the pipe 5 to be received by the clamp body 11 is r. When the clamp body 11 is elliptical without deformation, Q≤r is satisfied. When the clamp body is pressed such that the accommodating area 111 is circular, the radius of the accommodating area 111 is R, and Q+R>2r is satisfied. As shown in FIG. 4, when the clamp body completely tightens the pipe, the radius of the accommodating area is R', and R'<r is satisfied.

The actual meaning of the above formula is described as follow. When the clamp body 11 is to be sleeved outside the pipe 5, the clamp body 11 is first pressed at two ends in the direction of the long axis 3, such that the accommodating area 111 is substantially circular, therefore the pipe 5 can be free of contacting with the positioning member 2 and get into the accommodating area 111. Then, the clamp body 11 is released to deform and restore, at this time, both ends of the clamp body 11 in the direction of the short axis 4 and the top-contact head 21 press against the outer wall of the pipe 5, such that three-point contact is formed to increase the friction between the clamp body 11 and the pipe 5, achieving anti-looseness effect and avoiding the deviation of the clamp body 11 relative to the pipe 5. When the clamp body 11 completely tightens the pipe 5, the top-contact head 21 presses against the pipe 5 and falls off from the clamp body 11, especially when the clamp body 11 presses against the surface of the pipe 5 to deform.

As shown in FIG. 1, the top-contact head 21 is in the shape of a round rod which is easy to operate. One end of the top-contact head 21 located in the accommodating area 111 is provided with a limit portion 211 protruded in the radial direction. The limit portion 211 is used to prevent relative movement between the top-contact head 21 and the positioning hole 112 and prevent the positioning member 2 from falling out of the positioning hole 112 under the action of vibration or slight external force, which causes misleading. The upper and lower sides of the limit portion 211 are inclined arc surfaces, and the top-contact head 21 has a slot 212 extending in the axial direction of the top-contact head 21 and extending through the two ends of the top-contact head 21 in the radial direction. Therefore, the slot 212 divides the limit portion 211 into two parts being spaced apart, such that the limit portion can deform and contract inward, therefore the top-contact head 21 can fall out of the positioning hole 112 when pressed.

This application also provides a method for using the clamp, which includes the following step:

step S1, winding a clamping band 1 into a clamp body 11 that defines an accommodating area 111 with an elliptical shape;

step S2, pressing two ends of the clamp body 4 in the direction of a long axis 3 such that the accommodating area 111 is substantially circular, and making the clamp body 11 wind around a pipe 5 such that the clamp body 11 presses against an outer wall of the pipe 5 at two ends of a short axis 4; and step S3, tightening a tightening lug 14 by pliers so as to tighten the clamp body 11, such that a top-contact head 21 of the positioning member 2 presses against the outer wall of the pipe 5 and is gradually pressed out of a positioning hole 112 during tightening until an inner wall of the clamp body 11 rests against the outer wall of the pipe 5, followed by that the positioning member 2 falls off from the clamp body 11.

Further, after the clamp body 11 is tightened, the positioning member 2 that has not automatically fallen off from the clamp body 11 is removed.

Embodiment II

Figure 5:
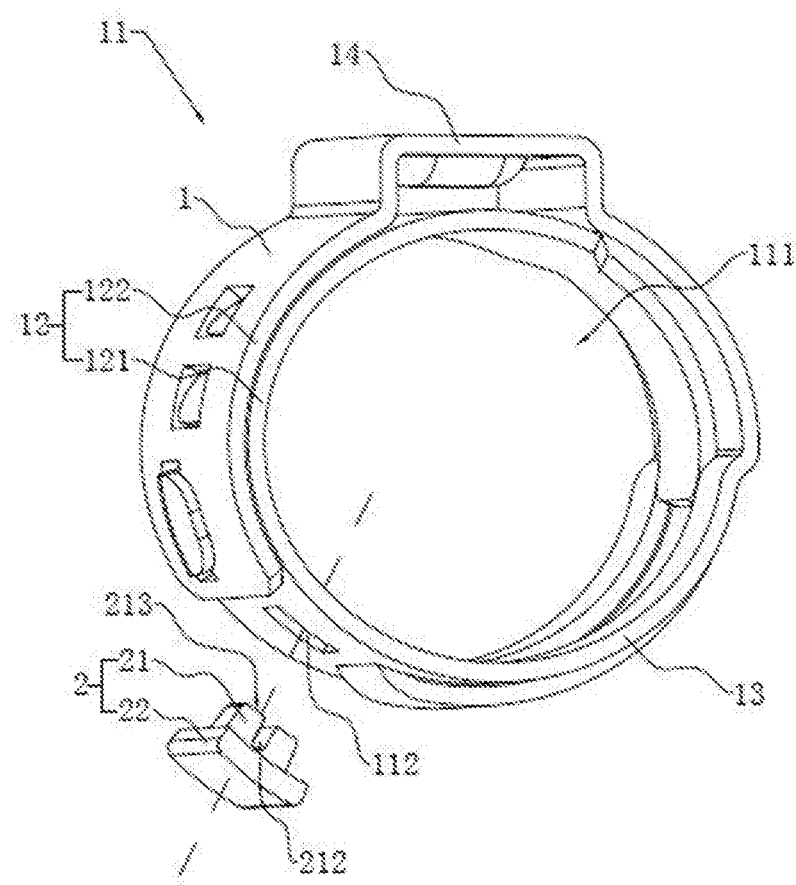
FIG. 5 is a schematic view of an overall structure of Embodiment II.
Figure 6:
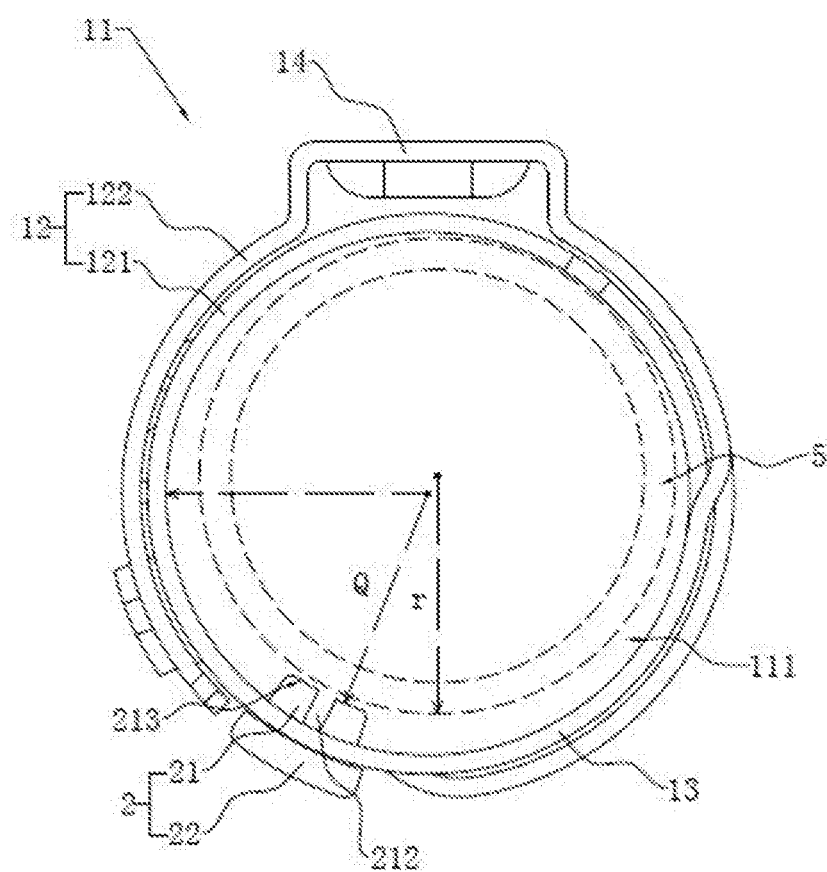
FIG. 6 is a structural schematic view of a clamp body of Embodiment II when it is circular under pressing.

This embodiment differs from Embodiment I in that, as shown in FIG. 5 and FIG. 6, the top-contact head 21 is in the shape of a block, and one end of the top-contact head 21 located in the accommodating area 111 is provided with an annular abutting surface 213 that is arcuate about the center of the accommodating area. The annular abutting surface 213 is used to contact the outer wall of the pipe 5, which increases the contact area and improves stability, preventing the top-contact head 21 from deviating to one side when it presses against the surface of the pipe 5 which affects the falling of the positioning member 2. An upper end of the top contact tip 21 has a slot 212 extending through both sides. The slot 212 enables the top-contact head 21 to deform and contract inward, such that the top-contact head 21 can fall out of the positioning hole 112 when pressed.

What is provided above is merely some preferred embodiments of this application. The scope of this application is not limited by the above embodiments, some improvements and modifications can be made by those skilled in the art without departing from the principle of this application, and should be considered to fall within the scope of this application.

What is claimed is:

1. A clamp, comprising a clamping band which is wound to form a clamp body defining an accommodating area; the clamp body comprising a single layer portion and an overlapping portion which comprises an outer band body and an inner band body; and the overlapping portion of the clamp body being provided with a tightening lug; wherein the clamp also comprises a positioning member; and the positioning member is connected to the single layer portion of the clamp body such that the positioning member is slidable toward an inner side of the accommodating area with one end of the positioning member extending into the accommodating area, wherein the accommodating area is elliptical shape that has a long axis and a short axis, said one end of the positioning member comprises a top-contact head extending into the accommodating area; and a minimum distance between a surface of the top-contact head and a center of the accommodating area and a radius of a pipe to be received by the clamp body satisfy the following relationship:

when the clamp body is elliptical without deformation, Q≤r;

when the clamp body is pressed such that the accommodating area is circular, Q+R>2r; and when the clamp body completely tightens the pipe, R'<r;

wherein Q is a minimum distance between the surface of the top-contact head and the center of the accommodating area, r is the radius of the pipe to be received by the clamp body, R is a radius of the accommodating area when the clamp body is pressed such that the accommodating area is circular, and R' is the radius of the accommodating area when the clamp body completely tightens the pipe.

2. The clamp according to claim 1, wherein a tightening stroke of the tightening lug is in a range of 4-14 mm.

3. The clamp according to claim 1, wherein a length radio of the long axis to the short axis is in a range of 65%-85%.

4. The clamp according to claim 1, wherein the positioning member is disposed in the single layer portion and located in a segment of the single layer portion between the short axis and the long axis.

5. The clamp according to claim 1, wherein the single layer portion has a positioning hole; the top-contact head passes through the positioning hole; one end of the top-contact head that is located in the accommodating area is provided with a limit portion protruded in a radial direction; and the other end of the top-contact head located outside the clamp body is provided with a limit block.

6. The clamp according to claim 5, wherein the top-contact head is in a shape of a round rod; and the top-contact head has a slot that extending axially along and radially through the top-contact head such that the limit portion is divided into two parts being spaced apart.

7. The clamp according to claim 5, wherein the top-contact head is in a shape of a block, and one end of the top-contact head located in the accommodating area is provided with an abutting surface that is arcuate about the center of the accommodating area; and the top-contact head has two slots extending through both sides.

8. A method for using the clamp according to claim 1, the method comprising the following steps:

step S1, winding the clamping band into the clamp body that defines the accommodating area with an elliptical shape;

step S2, pressing two ends of the clamp body in a direction of the long axis such that the accommodating area is substantially circular, and making the clamp body wind around the pipe such that the clamp body presses against an outer wall of the pipe at two ends of the short axis; and step S3, tightening the tightening lug by pliers so as to tighten the clamp body, such that the top-contact head of the positioning member presses against the outer wall of the pipe and is gradually pressed out of a positioning hole during tightening until an inner wall of the clamp body rests against the outer wall of the pipe, followed by that the positioning member falls off from the clamp body.

* * * * *